US007249201B1

(12) United States Patent
Mahmoud

(10) Patent No.: US 7,249,201 B1
(45) Date of Patent: Jul. 24, 2007

(54) SINGLE DRIVER FOR MULTIFUNCTIONAL SCSI CHIPS

(75) Inventor: Fadi A. Mahmoud, Livermore, CA (US)

(73) Assignee: Adaptec, Inc., Milpitas, CA (US)

( * ) Notice: Subject to any disclaimer, the term of this patent is extended or adjusted under 35 U.S.C. 154(b) by 558 days.

(21) Appl. No.: 10/850,203

(22) Filed: May 19, 2004

Related U.S. Application Data

(60) Provisional application No. 60/484,956, filed on Jul. 2, 2003.

(51) Int. Cl.
*G06F 13/10* (2006.01)
(52) U.S. Cl. ............... 710/8; 710/62; 713/1; 719/321; 719/326
(58) Field of Classification Search .............. None
See application file for complete search history.

(56) References Cited

U.S. PATENT DOCUMENTS 5,548,731 A * 8/1996 Chang et al. ............... 710/100
5,586,268 A * 12/1996 Chen et al. .................... 710/38
6,065,096 A * 5/2000 Day et al. .................... 711/114
6,851,007 B1 * 2/2005 Whitt et al. ................. 710/305
6,880,033 B1 * 4/2005 Mahmoud et al. .......... 710/305
6,970,986 B1 * 11/2005 Mahmoud .................... 711/158

* cited by examiner

*Primary Examiner*—Ilwoo Park
(74) *Attorney, Agent, or Firm*—Martine Penilla & Gencarella, LLP

(57) ABSTRACT

A method is provided for managing multiple functions of a multi-channel SCSI chip. The method includes hiding a first function of a multi-channel SCSI chip from an operating system, wherein the first function corresponds to a first channel of the multi-channel SCSI chip. The method also includes unhiding a second function of the multi-channel SCSI chip from the operating system, wherein the second function corresponds to a second channel of the multi-channel SCSI chip. The method also includes managing the first function and the second function with a single driver.

20 Claims, 11 Drawing Sheets

SINGLE DRIVER FOR MULTIFUNCTIONAL SCSI CHIPS

CROSS REFERENCE TO RELATED APPLICATIONS

This is a non-provisional application claiming priority from a U.S. Provisional Application No. 60/484,956 entitled "Single Driver for Multifunctional SCSI Chips", filed on Jul. 2, 2003. This application is also related to U.S. patent application Ser. No. 09/680,834, entitled "Dual-Channel SCSI Chips and Methods for Configuring Separate Interoperability of Each Channel of the SCSI Chip," and U.S. patent application Ser. No. 10/125,238, entitled "Methods for Configuring Separate Accessibility of Each Channel of a Dual Channel SCSI Chip." The disclosures of the aforementioned patent applications are incorporated herein by reference.

BACKGROUND OF THE INVENTION

1. Field of the Invention

This invention relates generally to computing technology and more particularly to using a single driver to manage multiple functions in a multi-channel SCSI chip capable of controlling multiple devices.

2. Description of the Related Art

To access and control certain types of peripheral devices connected to a computer system, the computer generally utilizes host adapter cards (or controllers) attached to the computer's peripheral component interconnect (PCI) bus. The computer may also have peripheral device controllers built into the motherboard. These controllers serve to coordinate and manage the data communication to and from the peripheral devices. Controllers may be in the form of a video display adapter, an integrated drive electronics (IDE) controller, a small computer system interface (SCSI) controller, or other similar cards or chips which control peripheral devices. Each of these controllers manage a single type of peripheral device and, if not built into the motherboard, takes up one expansion slot on the PCI bus.

FIG. 1 shows a computer configuration where two peripheral devices 40a and 40b are connected to a computer system 10, in accordance with the prior art. In one example, the peripheral devices 40a and 40b are RAID devices. The computer system 10 includes an operating system (OS) 42 that is run by the CPU. The OS controls two functions 30a and 30b which in turn manage the peripheral devices 40a and 40b through miniport drivers 24a and 24b. The two functions 30a and 30b are managed by separate chips which each control separate peripheral devices. In one example, the separate chips are SCSI chips. Each of the miniport drivers 24a and 24b are connected to the peripheral devices 40a and 40b through separate buses 44a and 44b. Thus, each of the peripheral devices 40a and 40b are managed by different chips through different miniport drivers (24a and 24b, respectively). In following, logical containers containing data in the peripheral devices 40a and 40b cannot be generated or managed because the miniport driver 24a is not aware of the miniport driver 24b. Therefore, the computer configuration of FIG. 1 is problematic when more flexible storage alternatives are desired.

Dual channel SCSI chips sharing the chip single system interface were introduced to ease system complication associated with multiple single channel SCSI chips. The dual channel SCSI chip uses the same software for both channels and can only perform as one type of SCSI channel. Therefore, the dual channel SCSI chip is not capable of controlling multiple types of peripheral devices having different functionality. Thus, the dual channel SCSI chip is limiting with respect to expanded device configurations. In addition, another typical problem encountered with dual channel SCSI chips involves the different channels not being aware of one another. For example, a RAID system can typically only be implemented using one channel and cannot be implemented using the drives controlled over different channels. Therefore, the dual channel SCSI chip does not alleviate the problems encountered in FIG. 1 above.

Therefore, a need exists for a method and apparatus to overcome the limitations of the prior art by utilizing a single driver that can assist in managing multiple functions of multiple channels.

SUMMARY OF THE INVENTION

The present invention provides a method and an apparatus by which a single miniport driver can efficiently manage multiple types of peripheral devices having different functionality. The present invention for managing peripheral devices enables some or all of the peripheral devices to be controlled by a common miniport driver, thus enabling generation, management, and use of logical containers including physical storage devices from different peripheral devices. Furthermore, the present invention provides for intelligent data storage management that enhances efficient use of data and computer resources. Several inventive embodiments of the present invention are described below.

In one embodiment, a method for managing multiple functions of a multi-channel SCSI chip is disclosed. The method includes exposing a first function of a multi-channel SCSI chip to an operating system. The first function corresponds to a first channel of the multi-channel SCSI chip. The method also includes hiding a second function of the multi-channel SCSI chip from the operating system. The second function corresponds to a second channel of the multi-channel SCSI chip. The method further includes managing the first function and the second function with a single driver.

In another embodiment, another method for managing multiple functions of a multi-channel SCSI chip is disclosed. In the method, a first function is assigned to a first channel of the multi-channel SCSI chip. Also, a second function is assigned to a second channel of the multi-channel SCSI chip. The method further includes managing the first function and the second function with a single driver, wherein the single driver knows the existence of the first function and the second function. Additionally, the first function and the second function are managed by an operating system through the single driver.

In yet another embodiment, an apparatus for managing multiple functions is disclosed. The apparatus includes an operating system and a multi-channel SCSI chip configured to communicate with the operating system. The multi-channel SCSI chip has multiple channels that are each associated with one of multiple functions. The apparatus also includes a multifunction miniport driver in communication with each of the multiple channels of the multi-channel SCSI chip. The multifunction miniport driver is configured to communicate with one or more peripheral devices through one or more communication links.

The advantages of the present invention are numerous. Most notably, the present invention enables hiding of one channel of a multi-channel SCSI chip and use of a single multifunction miniport driver (MMD) to manage multiple functions corresponding to multiple channels. Since a single MMD is used to manage multiple peripheral devices, each of the peripheral devices is known to the MMD. Therefore, the single MMD can manage each of the peripheral devices even though the peripheral devices are controlled by different functions of a peripheral device chip. Additionally, the present invention allows system resources to be assigned to functions associated with hidden channels of the multi-channel SCSI chip even though the system BIOS is unaware of the hidden channels. Furthermore, with the present invention multiple different types of peripheral devices can be controlled through use of the multi-channel SCSI chip and the single MMD, wherein the single MMD is aware of all necessary functions even if one or more of the necessary functions are hidden from the operating system.

Other aspects and advantages of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1:
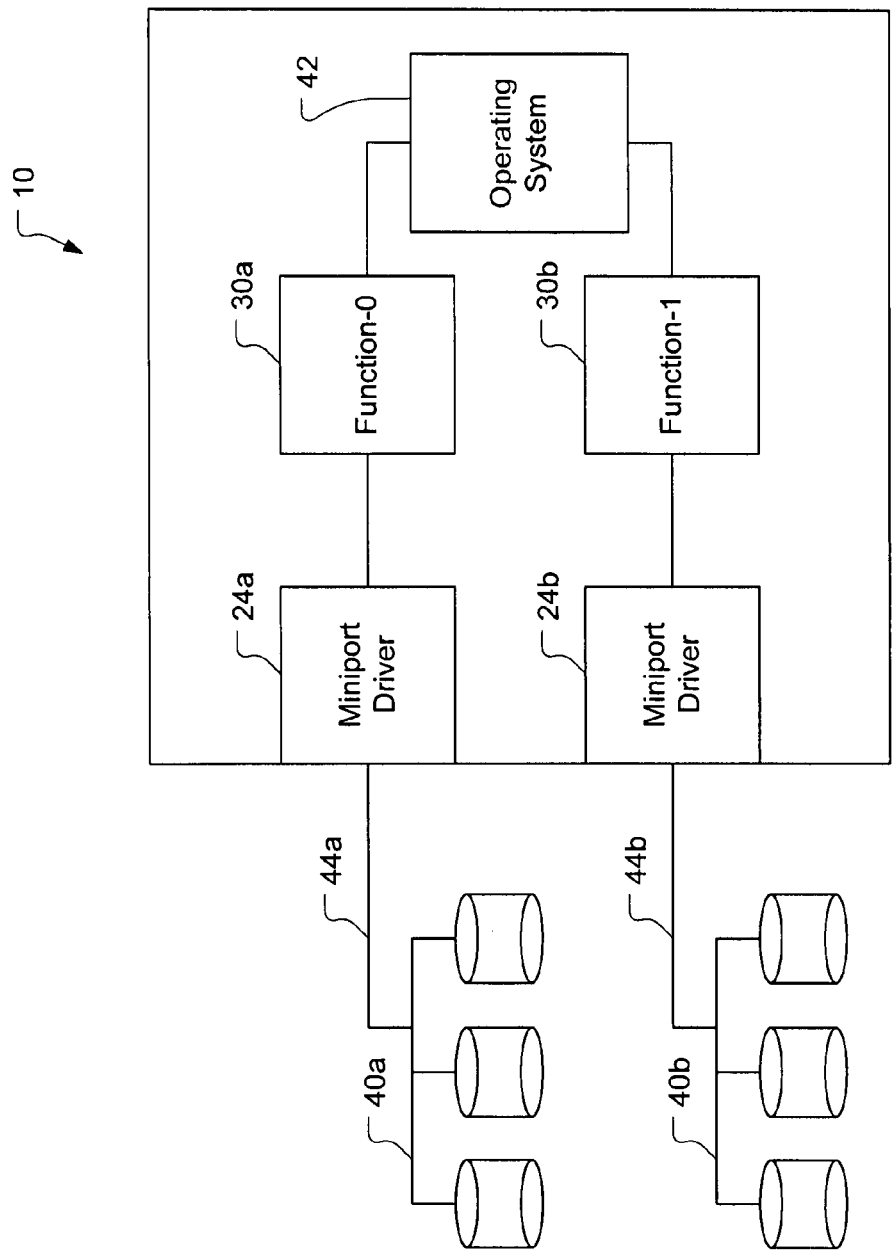
FIG. 1 shows a computer configuration where two peripheral devices are connected to a computer system, in accordance with the prior art.

An invention is described for a method and an apparatus to control multiple peripheral devices with a single SCSI chip. The single SCSI chip can use one driver to control multiple functions corresponding to multiple channels on the single SCSI chip.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The method and apparatus of the present invention is capable of controlling multiple peripheral devices through use of a single driver for managing multiple functions of a multi-channel SCSI chip. The single driver, which in one embodiment is a multifunction miniport driver, may manage multiple functions when one or more of the functions are hidden from an operating system.

As described in detail in U.S. patent application Ser. No. 09/680,834, entitled "Dual-Channel SCSI Chips and Methods for Configuring Separate Interoperability of Each Channel of the SCSI Chip", a single chip can be made to operate as if it were two separate chips. The aforementioned application is hereby incorporated by reference.

A method of hiding channels of the SCSI chip is described in detail in U.S. patent application Ser. No. 10/125,238, entitled "Methods for Configuring Separate Accessibility of Each Channel of a Dual Channel SCSI Chip", which is hereby incorporated by reference. As discussed in the aforementioned application, a dual channel SCSI chip may be configured so that at least one channel of the two or more channels may, in a sense, be hidden from an operating system. Since the operating system does not recognize the existence of the hidden control channel of the dual channel SCSI chip, the operating system does not operate on or manage the hidden control channel. As a result, certain functions corresponding to particular channels of a multi-channel SCSI chip may be hidden. Thus, the single chip (e.g., a SCSI chip) can be used in environments where multiple functions are desired to be controlled by a single multifunction device chip such as, for example, a SCSI chip. In one embodiment, the configuration of the SCSI chip is managed such that the operating system can utilize each channel of the multi-channel SCSI chip and communicate with one or more appropriate devices through use of a single multifunction miniport driver. Thus, the features of the present invention provide for a robust computing system configuration having improved efficiency and reduced implementation cost.

Figure 2:
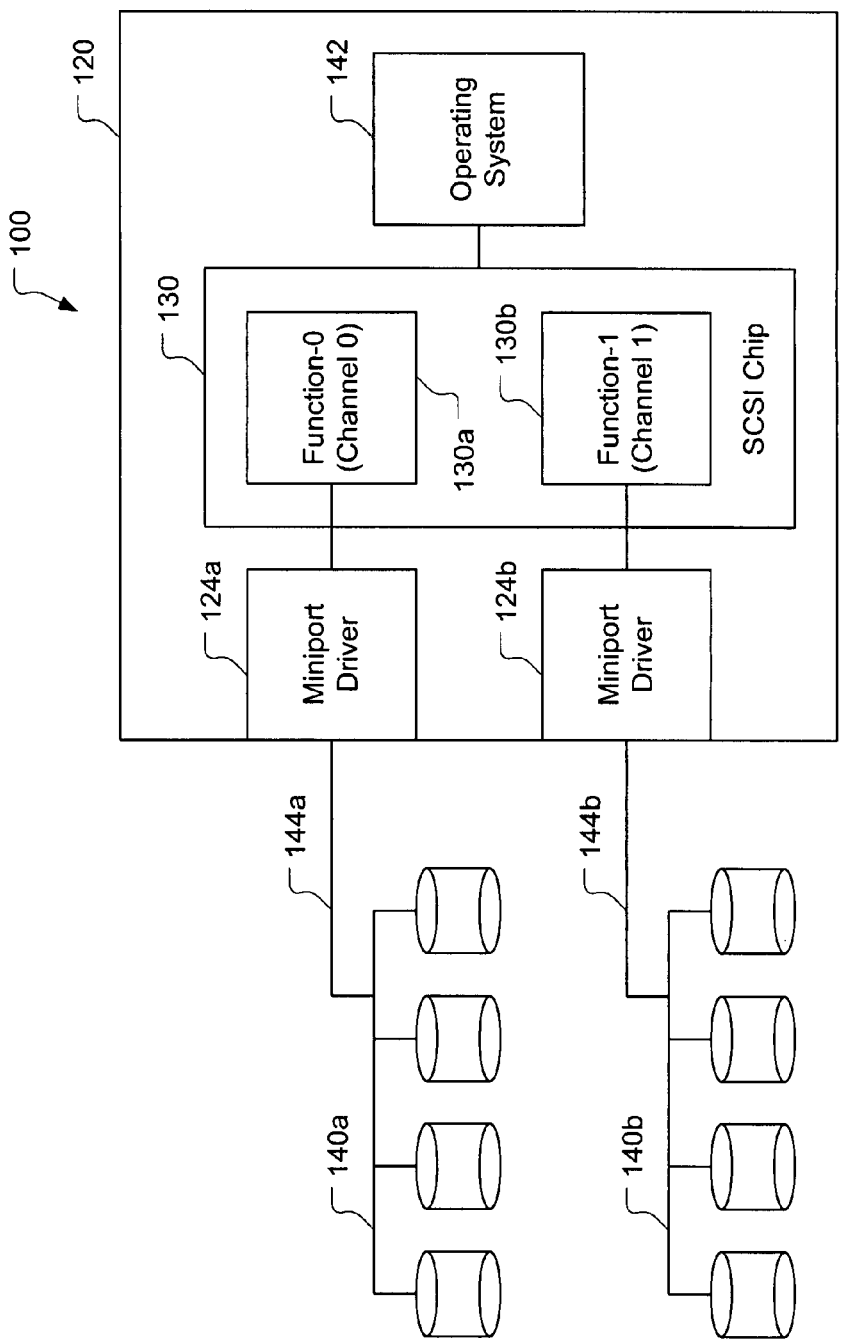
FIG. 2 shows a computer system, in accordance with one embodiment of the present invention.

FIG. 2 shows a computer system 100, in accordance with one embodiment of the present invention. The computer system 100 includes a computer 120 that has an operating system (OS) 142, a SCSI chip 130 and miniport drivers 124a and 124b. The operating system 142 may be any suitable type of operating system using any suitable configuration of code that may be run by a computer central processing unit (CPU) to operate the computer system 100. In one embodiment, the OS 142 implements a graphical user interface such as, for example, Windows made by Microsoft corporation. The OS 142 can communicate with the SCSI chip 130 which includes PCI Function-0 130a and PCI Function-1 130b. The SCSI chip 130 represents hardware that facilitates the management of SCSI devices connected to the computer system 100. In one embodiment, the SCSI chip 130 includes multiple channels that operate separate devices such as described in U.S. patent application Ser. No. 09/680,834 described above. Each of the channels of the SCSI chip 130 can be operated to manage PCI Function-0 130a and PCI Function-1 130b, respectively. In one embodiment, the channels represent portions of the SCSI chip 130 that include PCI configuration spaces for establishing parameters and data associated with the type of peripheral devices being controlled by the channels and the functions of the channels. In one embodiment, the PCI Function-0 130a involves the operation of a device 140a through use of a miniport driver 124a. Also, the PCI Function-1 130b involves the operation of a device 140b through use of a miniport driver 124b. In this configuration, the two miniport drivers 124a and 124b do not communicate with each other. Therefore, the devices 140a and 140b operate on separate buses, 144a and 144b, respectively. As a result, a single logical container in, for example, a RAID system cannot include disk drives in devices 140a and 140b. Therefore, although the system with the multi-channel SCSI chip can operate different types of peripheral devices without additional peripheral device chips, which is advantageous over the prior art, the different functions controlled by the separate channels of the multi-channel SCSI chip each utilize a separate miniport driver.

Figure 3:
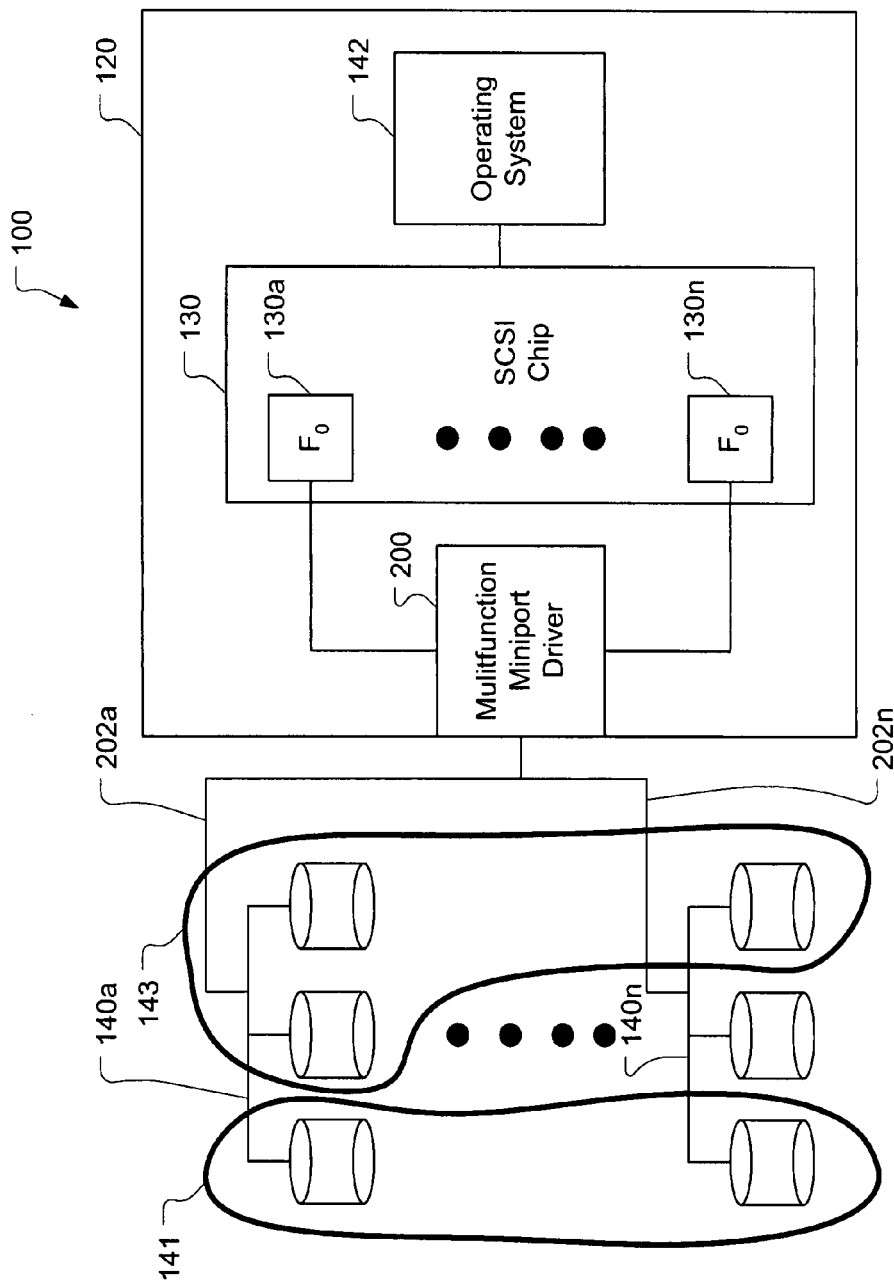
FIG. 3 shows a computer system using a multifunction miniport driver (MMD), in accordance with one embodiment of the present invention.

FIG. 3 shows a computer system 100 using a multifunction miniport driver (MMD) 200, in accordance with one embodiment of the present invention. The computer system 100 includes the computer 120 that has the OS 142, the SCSI chip 130, and the MMD 200 which is a part of the OS 142. In one embodiment, the SCSI chip 130 has numerous channels (0 through N) that operate separate devices. Each one of the channels 0 through N of the SCSI chip 130 are operated and managed by one of PCI Functions $F_0$ 130a through $F_N$ 130n, respectively. In one embodiment, the PCI Function-0 130a communicates with the device 140a through the MMD 200. In following, the PCI Function-1 130b (not shown) communicates with a device 140b (not shown) through the MMD 200. The MMD 200 is an operating system driver that enables the handling and managing of functions in the SCSI chip 130. Also, the MMD 200 knows the configuration of the SCSI chip 130, and thereby knows what functions exist within the different functions that are hidden from the OS 142. Therefore, by use of the MMD 200, more than one miniport driver is not necessary and multiple buses may still be utilized to communicate with different devices that are connected to the computer 120. In addition, because all of the devices 140a through 140n are controlled by a common MMD, RAID containers may extend across different devices. In one embodiment, if the device 140a and the device 140n are RAID arrays, then the RAID system can be configured so that a particular RAID container includes disk drives from both device 140a and device 140n, such as shown by logical containers 141 and 143. Without the MMD 200, such a configuration of logical containers across the devices 140a through 140n would not be possible because the individual miniport drivers 124a and 124b, as shown in FIG. 2, do not communicate with each other and, therefore, do not know all the devices attached to the computer 120. Thus, the MMD 200 manages communications between the OS 142 and the devices 140a through 140n connected to the computer 120.

It should be understood that the devices 140a through 140n represent any suitable type of computing devices that are capable of communicating with the computer 120. For example, the devices 140a through 104n can include hard disk drives, RAID arrays, floppy drives, CD-RWs, CD-Rs, memory sticks, etc. In one specific exemplary embodiment, the devices 140a through 104n are RAID arrays with multiple disk drives contained therein.

In one embodiment, the SCSI chip 130 includes functions $F_0$ through $F_N$. It should be appreciated that N may be any suitable number depending on the desired number of functions and the available number of channels. For example, in one embodiment the maximum number for N is 8 (i.e., representing $F_0$ through $F_7$). Depending on the embodiment, N may be any suitable number greater than 0. Therefore, the SCSI chip 130 may have any suitable number of channels capable of serving any number of respective functions. It should be appreciated that any of the functions of the SCSI chip 130 can be defined to manage any suitable type of computing device such as, for example, buses, routers, servers, storage devices, hard disk drives, floppy drives, CD-Rs, CD-RWs, RAID containers, etc.

Therefore, in an exemplary operation, the MMD 200 can be used to manage both hidden and visible functions where the OS 142 does not know of the existence of the hidden channels/functions. In such an operation, the OS 142 may know that multiple buses exist, but the MMD 200 is the entity that has knowledge of the multiple functions. As a result, the OS 142 views one function to be managed. Therefore, through the one SCSI chip 130, multiple functions can be performed using the one MMD 200. Consequently, devices attached to the computer 120 can be managed in a more flexible and intelligent manner. Exemplary embodiments, such as generating logical storage units encompassing multiple functions (e.g., multiple storage devices), illustrate the effectiveness of using the MMD 200.

When one or more channels are hidden from the OS 142, drivers are not assigned to the functions of the hidden channels because the OS 142 does not know that the hidden channels and their respective functions exist. Therefore, resources are not allocated to the hidden functions by the OS 142, and the functions are not able to be utilized. However, in one embodiment of the present invention there is a way to allocate system resources to the hidden channels/functions. More specifically, the option ROM BIOS or predetermined configuration of EEPROM can be utilized to allocate system resources to the hidden channels/functions, as discussed in further detail below with respect to FIG. 11.

Figure 4:
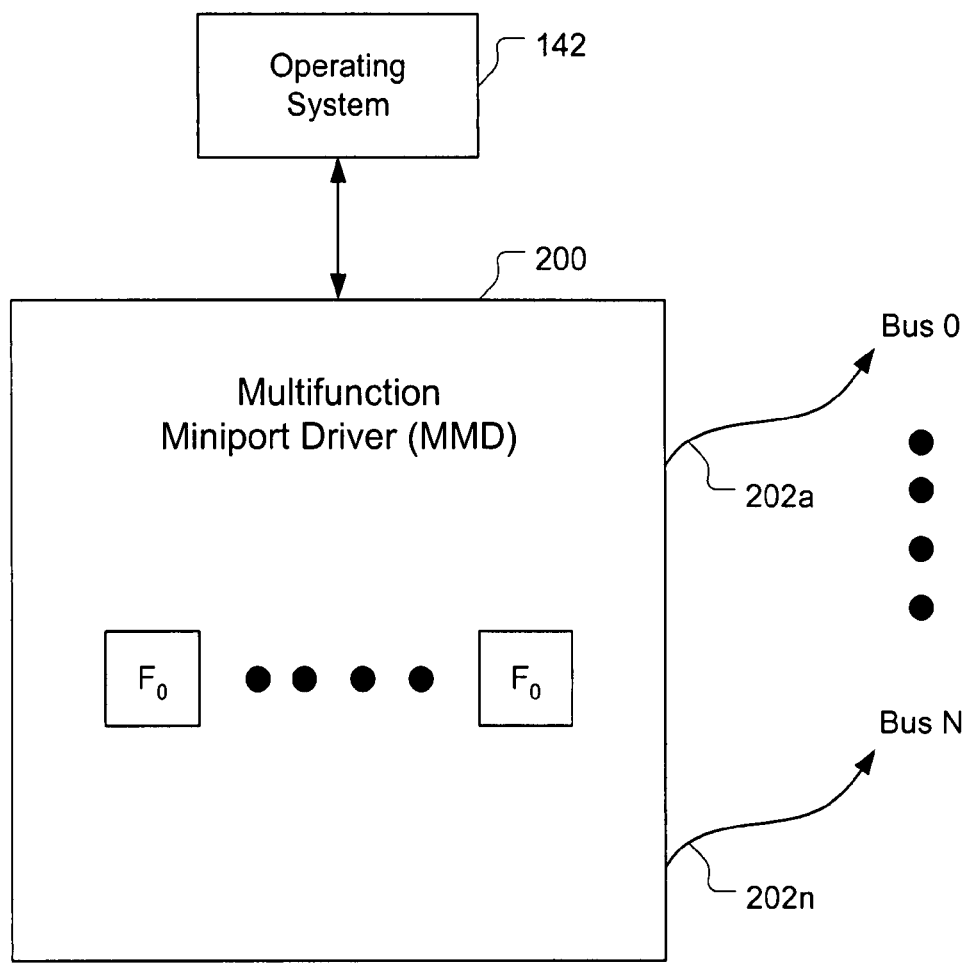
FIG. 4 is an illustration showing functionality of the MMD in accordance with one embodiment of the present invention.

FIG. 4 is an illustration showing functionality of the MMD 200 in accordance with one embodiment of the present invention. The MMD 200 can be any suitable type of code or hardware that is capable of being utilized by the OS 142 to manage the channels in the SCSI chip 130, as described above with respect to FIG. 3. In one embodiment, the MMD 200 is capable of being utilized by the OS 142 implementing a graphical user interface. The MMD 200 can be configured to manage any suitable number of functions ($F_0$ through $F_N$) through the SCSI chip 130. Regardless of the number of functions handled by the MMD 200, the OS 142 will see one miniport driver (e.g., the MMD 200) and one function managed by the MMD 200. Therefore, the OS 142 considers that there is only one function even though the MMD 200 may manage any suitable number of functions. In other words, except for the one visible function, the other functions are hidden from the OS 142. The hiding of the other functions is described in further detail with respect to FIG. 7 and also in reference to U.S. patent application Ser. No. 10/125,238 described above. Through communication with the MMD 200, the OS 142 is capable of effectively controlling and managing multiple devices connected to the SCSI chip 130.

Figure 5:
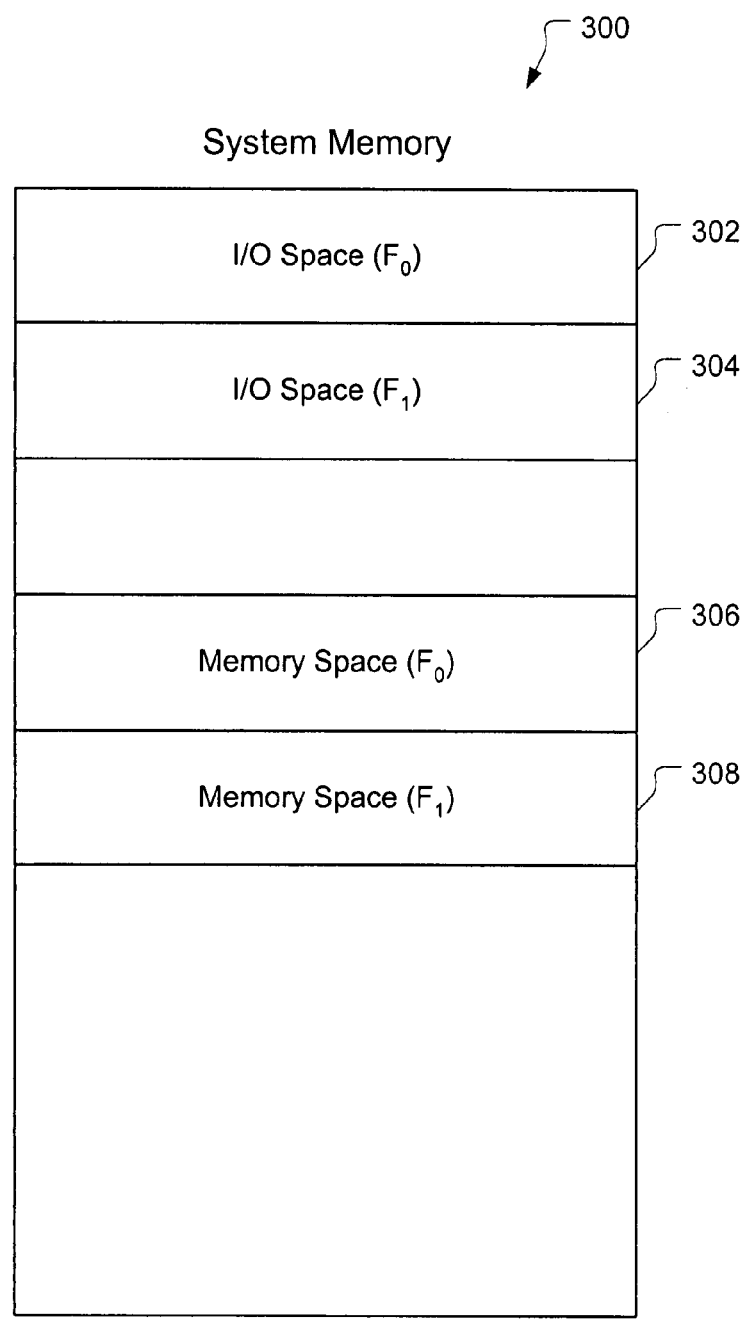
FIG. 5 shows a memory space allocation in a system memory, in accordance with one embodiment of the present invention.

FIG. 5 shows a memory space allocation in a system memory 300, in accordance with one embodiment of the present invention. It should be understood that the memory space may be allocated in any suitable manner as long as the functions managed by the SCSI chip 130 are capable of having resource allocations. In one embodiment, memory allocation is utilized to handle a situation in which one or more functions managed by the SCSI chip 130 through the MMD 200 are hidden from the SCSI chip 130, thus causing the OS 142 to be unable to assign resources (both memory and I/O resources) to the hidden functions during bootup. Thus, unless the hidden functions are assigned the memory and I/O resources, the hidden functions may not be operable. With respect to the embodiment of FIG. 5, the SCSI chip 130 has dual functions. An input/output (I/O) space 302 and a memory space 306 are allocated for the first function ($F_0$) by the system BIOS because the first function ($F_0$) is visible to the system BIOS. The system BIOS encapsulates all the resources needed for all of the functions. An I/O space 304 and memory space 308 are allocated to the second function ($F_1$) by the option ROM BIOS because the system BIOS cannot assign system resources to functions it does not know exists. The allocation of memory may occur in any portion of system memory where system resources are configured to be located as defined by a particular system BIOS and/or operating system. With respect to the embodiment of FIG. 5, the I/O space 302 is allocated to the unhidden function by the system BIOS. Therefore, the option ROM BIOS, after bootup, determines that the I/O space 302 has been allocated to the unhidden function. Then, the option ROM BIOS finds an I/O space 304 that is an appropriate amount of memory space away from the I/O space 302 and allocates the I/O space 304 to the hidden function. Continuing with the embodiment of FIG. 5, the memory space 306 is allocated to the unhidden function by the system BIOS. The option ROM BIOS determines the memory location occupied by the memory space 306 and finds a memory space 308 that is an appropriate amount of memory space away from the memory space 306 and allocates the memory space 308 to the hidden function. In an expansion of the embodiment described with respect to FIG. 5, one or more additional functions can also be allocated system resources in a similar manner as described above.

Figure 6:
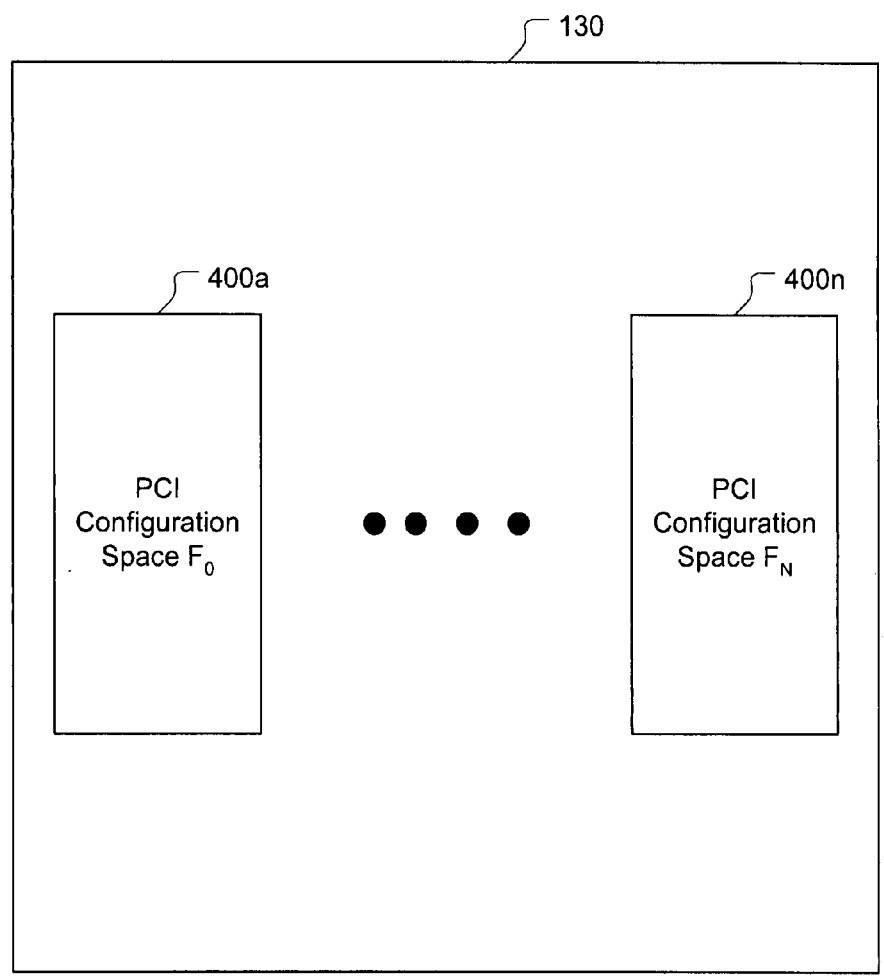
FIG. 6 illustrates a version of the SCSI chip with PCI configuration spaces for N functions, in accordance with one embodiment of the present invention.

FIG. 6 illustrates a version of the SCSI chip 130 with PCI configuration spaces 400a through 400n for N functions, in accordance with one embodiment of the present invention. It should be appreciated that the SCSI chip 130 may have any suitable number of functions and therefore may have any suitable number of PCI configuration spaces for each of the functions. In one embodiment, the SCSI chip 130 includes PCI configuration spaces 400a through 400n allocated for operation of functions $F_0$ through $F_N$, respectively.

Figure 7:
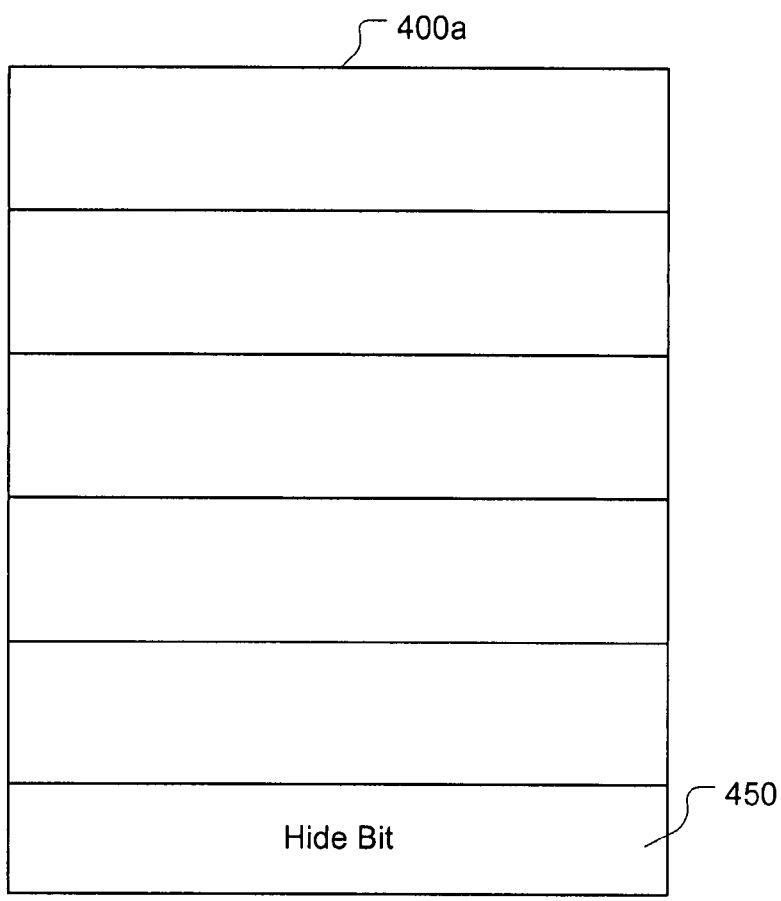
FIG. 7 shows the PCI configuration space within the SCSI chip, in accordance with one embodiment of the present invention.

FIG. 7 shows the PCI configuration space 400a within the SCSI chip 130, in accordance with one embodiment of the present invention. In one embodiment, the PCI configuration space 400a includes PCI configuration data. The PCI configuration space 400a, includes space 450 to designate hiding or unhiding of a particular channel. To hide a channel, at least one bit, which in one embodiment is a control bit, is set in a PCI configuration space for the channel sought to be hidden, and this bit may determine whether the channel is to be hidden or not. Even though the PCI configuration space for the hidden channel is filled with data, information returned to the operating system during initialization indicates that the hidden channel does not exist. In one embodiment, the PCI configuration space for the hidden channel does not contain any device identification information when accessed by the operating system. In another embodiment, the PCI configuration space is set to return a null data value indicating that the configuration space does not contain any device identification information when accessed by the operating system. In yet another embodiment, an operating system receives a read abort when the operating system requests access to the device identification information for the hidden channel.

As previously mentioned, to hide a channel, at least one bit is set in a configuration space to indicate that the channel is to be hidden. In one embodiment, the at least one bit includes a control bit which is capable of determining whether the channel is to be hidden. In one embodiment, the control bits in the hidden and unhidden channels are located in register address FFh of the respective configuration spaces of the channels.

Unhidden channels contains data that would normally be contained in any channel that is to be controlled by the operating system. In one embodiment, the configuration space of the unhidden channel is set to return device identification information of the device controlled by the unhidden channel when accessed by the operating system. In one embodiment, the device identification information includes at least one of a device ID, a vendor ID, a sub device ID, and a sub vendor ID. Therefore, the unhidden channel is detected and managed by the operating system while the hidden channels and the functions corresponding to the hidden channels are not detected by the operating system. As a result, the hidden channel and function are managed by a device processor, for example, on a host adapter card. Therefore, through the hiding of one or more particular channels, the operating system does not know of the existence of particular functions controlled by the one or more hidden channels. Further examples of how channels may be hidden and unhidden is described in U.S. patent application Ser. No. 10/125,238 which is incorporated herein by reference.

It should be understood that the processes described below with respect to FIGS. 8, 9, and 10 can be in a program instruction form written on any type of computer readable media. For instance, the program instructions can be in the form of software code developed using any suitable type of programming language. For completeness, the process flows of FIGS. 8, 9, and 10 will illustrate an exemplary method whereby a single driver manages multiple functions of a multi-channel SCSI chip.

Figure 8:
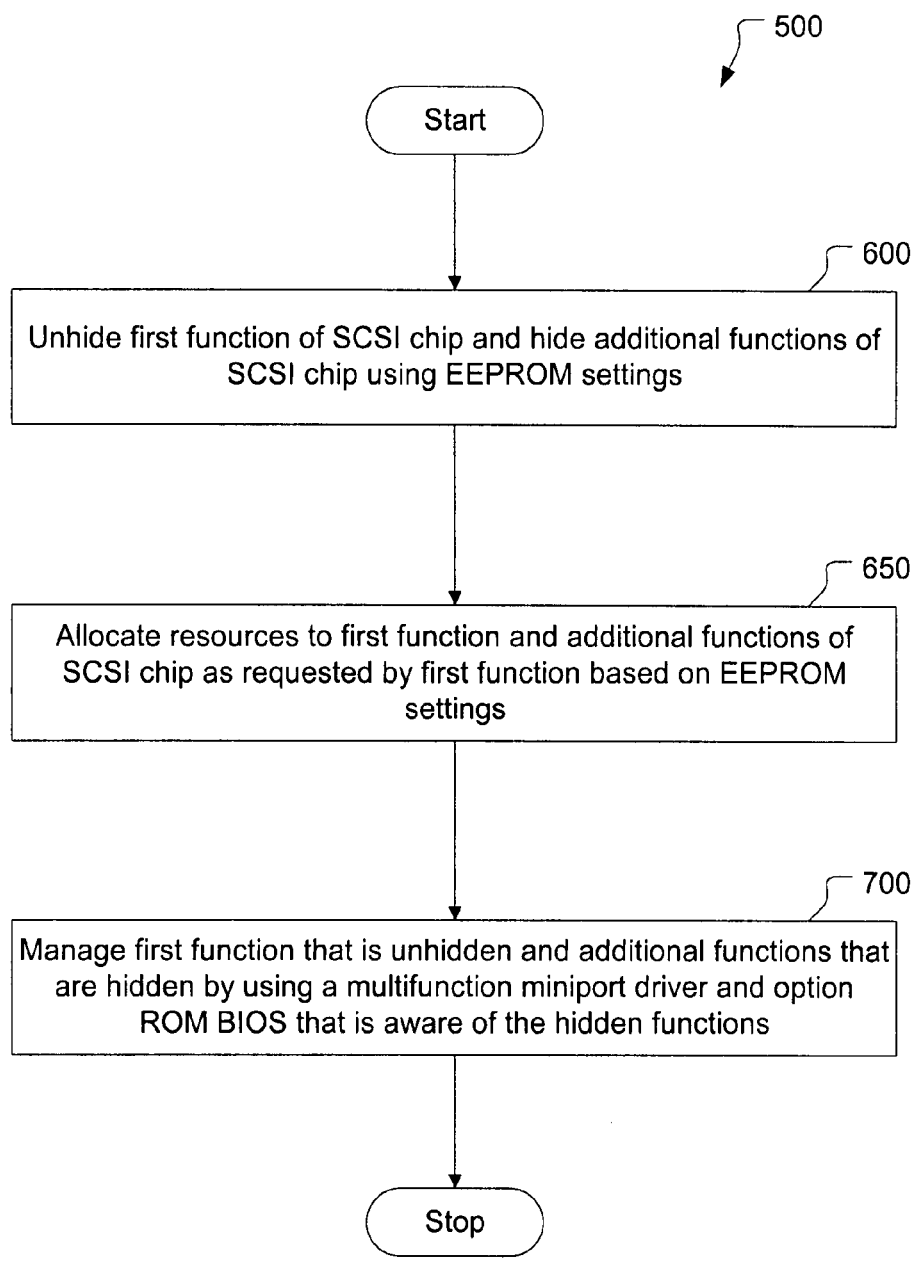
FIG. 8 illustrates a flowchart defining a method for managing unhidden and hidden functions by a single driver, in accordance with one embodiment of the present invention.

FIG. 8 illustrates a flowchart 500 defining a method for managing unhidden and hidden functions by a single driver, in accordance with one embodiment of the present invention. The method begins with an operation 600 which unhides a first function of a SCSI chip and hides one or more additional functions of the SCSI chip by EEPROM settings. In this embodiment, the first function of the SCSI chip is visible to the operating system. Any additional functions of the SCSI chip are hidden. The operation 600 is described in further detail with respect to FIG. 9. It should be appreciated that although a multi-channel SCSI chip is used in the exemplary embodiments, other types of multi-channel peripheral device controlling chips may be utilized with the multifunctional driver.

After the operation 600, the method proceeds to an operation 650 where resources are allocated to the first function and the one or more additional hidden functions of the SCSI chip as requested by the first function based on EEPROM settings. Operation 650 is described in further detail with respect to FIG. 10.

Then an operation 700 is provided for managing the first function, which is unhidden, and the one or more additional hidden functions. The management of operation 700 is performed using a multifunction miniport driver and option ROM BIOS that is aware of the one or more additional hidden functions. It should be appreciated that driver as used herein may be any suitable type of driver such as, for example, a device driver that can manage both the hidden and unhidden functions. In one embodiment, the driver is a miniport driver that is utilized by an operating system to manage and control the devices attached to the system.

Figure 9:
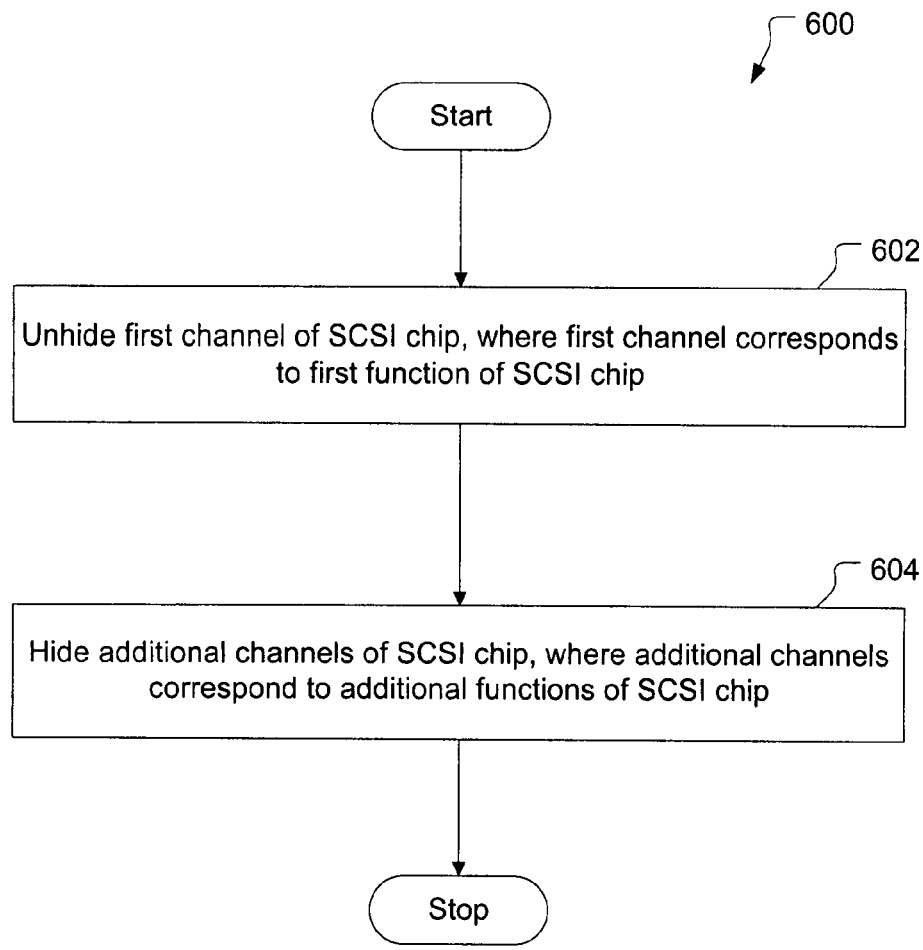
FIG. 9 shows a flowchart corresponding to the operation 600 of FIG. 8, in accordance with one embodiment of the present invention.

FIG. 9 shows a flowchart corresponding to the operation 600 of FIG. 8, in accordance with one embodiment of the present invention. As previously described with respect to FIG. 8, the operation 600 is provided for unhiding the first function of the SCSI chip and hiding the one or more additional functions of the SCSI chip through use of EEPROM settings. With respect to FIG. 9, an operation 602 is provided in which the first channel of the SCSI chip is unhidden. The first channel corresponds to the first function of the SCSI chip. In one embodiment, the first channel is unhidden by configuring the PCI configuration space within the first channel to have PCI configuration data that identifies the first channel to the system BIOS and the operating system.

After operation 602, the method continues to an operation 604 for hiding one or more additional channels of the SCSI chip, wherein the one or more additional channels correspond to the one or more additional functions of the SCSI chip. In one embodiment the PCI configuration spaces of the one or more additional channels to be hidden have data which enables the return of null data to the system BIOS during an initialization process. The system BIOS, and in turn the operating system, believes that the channel returning the null data is not being used. Therefore, the channel returning the null data is hidden to the system BIOS and the operating system. Alternatively, the option ROM BIOS can be pre-programmed to know the existence of the one or more hidden channels and may utilize it to manage one or more devices. Additional exemplary ways of hiding and unhiding channels of a multi-channel SCSI chip are described in U.S. patent application Ser. No. 10/125,238, previously identified as being incorporated herein by reference.

Figure 10:
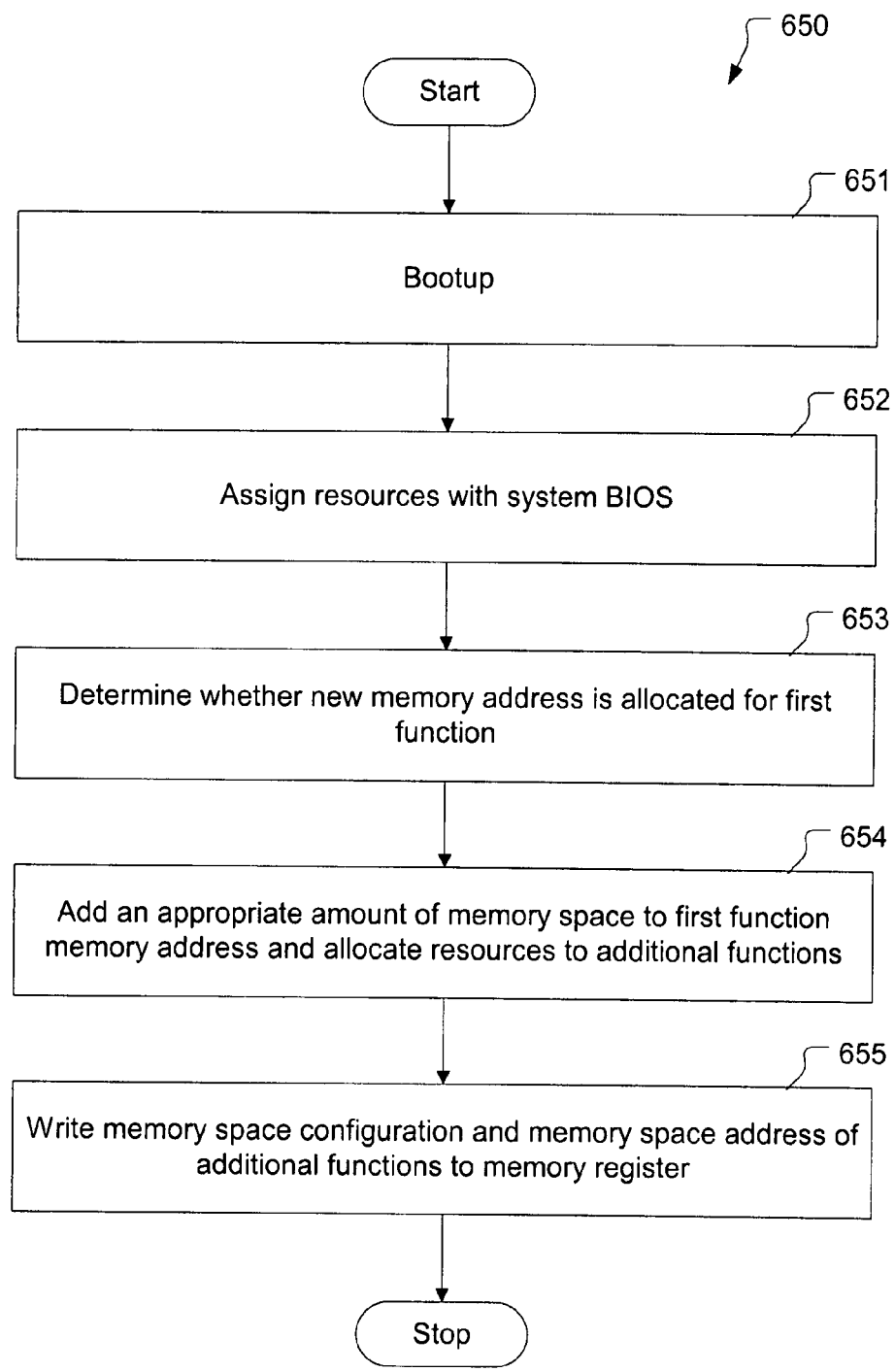
FIG. 10 shows a flowchart corresponding to the operation 650 of FIG. 8, in accordance with one embodiment of the present invention.

FIG. 10 shows a flowchart corresponding to the operation 650 of FIG. 8, in accordance with one embodiment of the present invention. As previously described with respect to FIG. 8, the operation 650 is provided for allocating resources to the first function and the one or more additional functions of the SCSI chip as requested by the first function based on EEPROM settings. With respect to FIG. 10, an operation 651 is provided for booting up a computer system. An operation 652 follows in which resources are assigned with a system BIOS. In one embodiment, system resources are assigned to the first function according to a PCI configuration space corresponding to the channel controlling the first function. In such an embodiment, during an initialization process, the system BIOS requests identification data from the PCI configuration space of the unhidden channel. Once the system BIOS determines the identification of the unhidden channel and, therefore, the first function, the system BIOS allocates system resources to the unhidden channel.

In one embodiment, the system BIOS does not detect the one or more additional hidden functions corresponding to the one or more additional channels of the multifunctional SCSI chip. Therefore, the system BIOS does not assign system resources to the one or more hidden functions associated with the one or more hidden channels. In another embodiment, the system BIOS determines that the one or more additional functions are hidden and does not assign system resources to one or more additional functions. As discussed above, the one or more additional functions may be signified as being hidden when the PCI configuration space of the corresponding hidden channel returns data to the system BIOS indicating that the channel does not exist.

Following the operation 652, an operation 653 is performed for checking to determine whether a new memory address has been allocated for the first function. In one embodiment, after the operating system is operational, the option ROM BIOS checks to see if memory has been allocated for the first function. If memory has been allocated for the first function, the configuration of the memory allocation is determined. In one embodiment, the configuration of the memory allocation includes a memory space configuration and a memory space address of the resources allocated to the first function.

An operation 654 is then performed to add an appropriate amount of memory space to a first function memory address and allocate resources to the one or more additional hidden functions. In one embodiment, the option ROM BIOS determines that there are N additional hidden functions and proceeds to allocate system resources to the additional hidden functions. In one embodiment, system resources are allocated to the additional hidden functions by allocating an appropriate amount of memory space extending from the end of the memory space allocated to the first function. However, it should be appreciated that the location or address of the system resources assigned to the one or more additional hidden functions may be any suitable memory address or memory space.

An operation 655 is then performed to write memory space configuration and address information associated with the additional hidden functions to a memory register. In one embodiment, the system resources allocated to the one or more additional hidden functions are written into the memory register by the option ROM BIOS. In following, resources allocated for the one or more additional hidden functions can be used for their respective operation.

Figure 11:
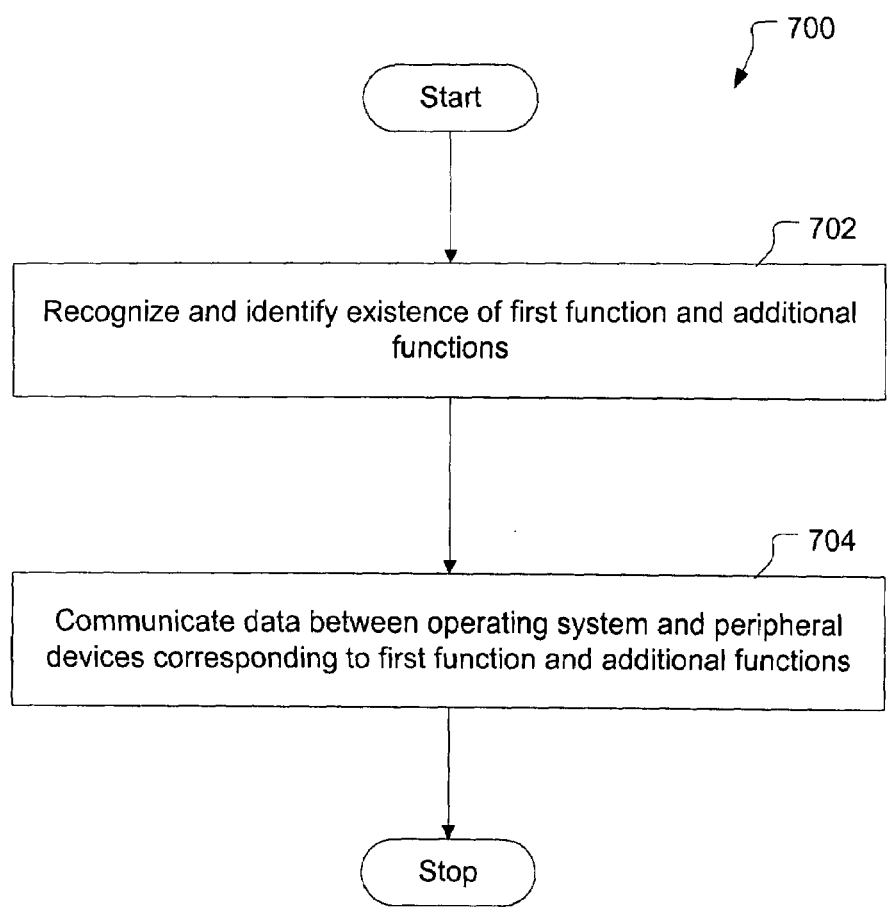
FIG. 11 shows a flowchart corresponding to the operation 700 of FIG. 8, in accordance with one embodiment of the present invention.

FIG. 11 shows a flowchart corresponding to the operation 700 of FIG. 8, in accordance with one embodiment of the present invention. As previously described with respect to FIG. 8, the operation 700 is provided for managing the first function, which is unhidden, and the one or more additional hidden functions through use of the multifunction miniport driver and the option ROM BIOS. With respect to FIG. 11, an operation 702 is performed to recognize and identify an existence of the first function and the one or more additional hidden functions. In one embodiment, the multifunction miniport driver is configured to be aware of the existence of the one or more additional hidden functions even though those functions are hidden from the system BIOS and the operating system. Therefore, the operating system will be aware that there are two buses but will not be aware that there are two or more functions.

In one embodiment, the option ROM BIOS is programmed to know that the one or more additional hidden channels exist. Therefore, the option ROM BIOS can determine what system memory was allocated to the unhidden function and can allocate additional memory to the one or more additional hidden functions.

An operation 704 is provided for communicating data between the operating system and the peripheral devices corresponding to the first function and the one or more additional hidden functions. In one embodiment, operation 704 utilizes the multifunction miniport driver to enables communication between the operating system and the peripheral devices. When the multifunction miniport driver is utilized, the operating system is aware that there are two buses but is not aware of the additional hidden functions. Consequently, because the multifunction miniport driver knows that there are multiple functions, the multifunction miniport driver assists in the operation of the multiple functions and enables interworking between the multiple functions.

In an exemplary embodiment, multiple RAID arrays are controlled by a multi-channel SCSI chip. Through use of the multifunction miniport driver, data can be managed such that logical containers can be established to encompass the multiple RAID arrays. Therefore, a given logical container can include storage devices associated with the first function and storage devices associated with the second function (which in this embodiment is hidden). As a result, the multifunction miniport driver provides for increased flexibility of peripheral device usage and enhanced management of data.

The present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus may be specially constructed for the required purposes, or may be a general purpose computer selectively activated or configured by a computer program stored in the computer. In particular, various general purpose machines may be used with computer programs written in accordance with the teachings herein. Alternatively, it may be more convenient to construct a more specialized apparatus to perform the required operations.

The present invention can also be embodied as computer readable code on a computer readable medium. The computer readable medium is any data storage device that can store data which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing multiple functions of a multi-channel SCSI chip, comprising:
   exposing a first function of a multi-channel SCSI chip to an operating system, the first function corresponding to a first channel of the multi-channel SCSI chip;
   hiding a second function of the multi-channel SCSI chip from the operating system, the second function corresponding to a second channel of the multi-channel SCSI chip; and
   managing the first function and the second function with a single driver.

2. A method for managing multiple functions of a multi-channel SCSI chip as recited in claim 1, wherein exposing the first function includes setting at least one bit in a first configuration space within the first channel, the first configuration space being configured to return device identification information when accessed by the operating system, the first channel and the first function being detected and managed by the operating system.

3. A method for managing multiple functions of a multi-channel SCSI chip as recited in claim 1, wherein hiding the second function includes setting at least one bit in a second configuration space within the second channel, the second configuration space being configured to return data indicating that the second configuration space does not contain any device identification information when accessed by the operating system, the second channel and the second function being managed by a device processor.

4. A method for managing multiple functions of a multi-channel SCSI chip as recited in claim 2, wherein the at least one bit in the first configuration space includes a first control bit, the first control bit being capable of identifying the first channel to the operating system.

5. A method for managing multiple functions of a multi-channel SCSI chip as recited in claim 2, wherein the at least one bit in the second configuration space includes a second control bit, the second control bit signifying that the second channel is hidden from the operating system.

6. A method for managing multiple functions of a multi-channel SCSI chip as recited in claim 1, wherein the single driver is a multifunction miniport driver (MMD) in communication with the operating system.

7. A method for managing multiple functions of a multi-channel SCSI chip as recited in claim 6, further comprising:
   allocating system resources for the first function and the second function, the system resources being allocated for the first function by a system BIOS, and the system resources being allocated for the second function by an option ROM BIOS in a host adapter.

8. A method for managing multiple functions of a multi-channel SCSI chip as recited in claim 7, wherein the system resources for the first function include a first memory space and a first input/output (I/O) space in a system memory and the system resources for the second function include a second memory space and a second I/O space in the system memory.

9. A method for managing multiple functions of a multi-channel SCSI chip as recited in claim 1, wherein managing the first function and the second function with the single driver includes utilizing the first function and the second function as one function.

10. A method for managing multiple functions of a multi-channel SCSI chip as recited in claim 1, further comprising:
    managing additional functions of the multi-channel SCSI chip with the single driver.

11. A method for managing multiple functions of a multi-channel SCSI chip, comprising:
    assigning a first function to a first channel of the multi-channel SCSI chip;
    assigning a second function to a second channel of the multi-channel SCSI chip; and
    managing the first function and the second function with a single driver, the single driver knowing the existence of the first function and the second function, wherein the first function and the second function are managed by an operating system through the single driver.

12. A method for managing multiple functions of a multi-channel SCSI chip as recited in claim 11, wherein the second function is hidden from the operating system and detected by the single driver.

13. A method for managing multiple functions of a multi-channel SCSI chip as recited in claim 12, further comprising:
   exposing the first function to the operating system by setting at least one bit in a first configuration space within the first channel, the first configuration space being configured to return device identification information when accessed by the operating system, the first channel and the first function being detected and managed by the operating system; and
   hiding the second function from the operating system by setting at least one bit in a second configuration space within the second channel, the second configuration space being configured to return data indicating that the second configuration space does not contain any device identification information when accessed by the operating system, the second channel and the second function being managed by a device processor.

14. A method for managing multiple functions of a multi-channel SCSI chip as recited in claim 11, wherein the single driver is a multifunction miniport driver (MMD) in communication with the operating system.

15. A method for managing multiple functions of a multi-channel SCSI chip as recited in claim 11, further comprising:
   allocating system resources for the first function and the second function, the system resources being allocated for the first function by a system BIOS, and the system resources being allocated for the second function by an option ROM BIOS in a host adapter.

16. A method for managing multiple functions of a multi-channel SCSI chip as recited in claim 15, wherein the system resources include a memory space and an input/output (I/O) space in a system memory.

17. An apparatus for managing multiple functions, comprising:
   an operating system;
   a multi-channel SCSI chip configured to communicate with the operating system, the multi-channel SCSI chip having multiple channels respectively associated with multiple functions; and
   a multifunction miniport driver in communication with each of the multiple channels of the multi-channel SCSI chip, the multifunction miniport driver being configured to communicate with one or more peripheral devices through one or more communication links.

18. An apparatus for managing multiple functions as recited in claim 17, wherein the multifunction miniport driver is further configured to direct instructions generated by each of the multiple functions from the respective one of the multiple channels to one or more appropriate peripheral devices.

19. An apparatus for managing multiple functions as recited in claim 17, wherein the multi-channel SCSI chip further includes configuration spaces for each of the multiple channels, the configuration spaces being capable of storing data associated with the multiple channels and multiple functions.

20. An apparatus for managing multiple functions as recited in claim 19, wherein one of the configuration spaces is configured to expose channel and function data to the operating system, a remaining number of the configuration spaces being configured to hide channel and function data from the operating system.

* * * * *